A. BENTON & C. D. JORDAN.
COMBINED CULTIVATOR, HARROW, AND RAKE.
APPLICATION FILED AUG. 5, 1907.
902,367.
Patented Oct. 27, 1908.
2 SHEETS—SHEET 1.
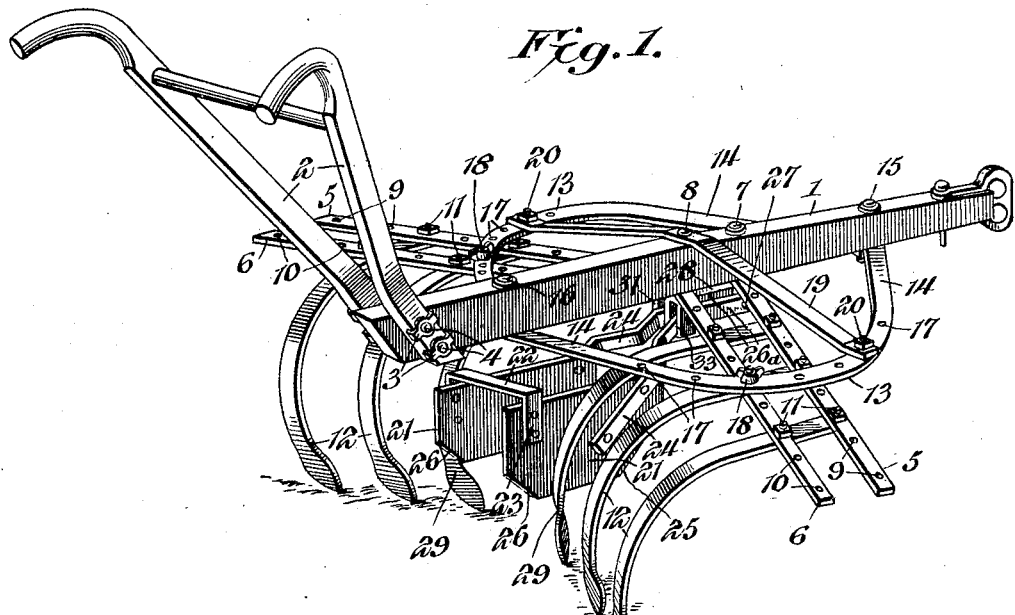
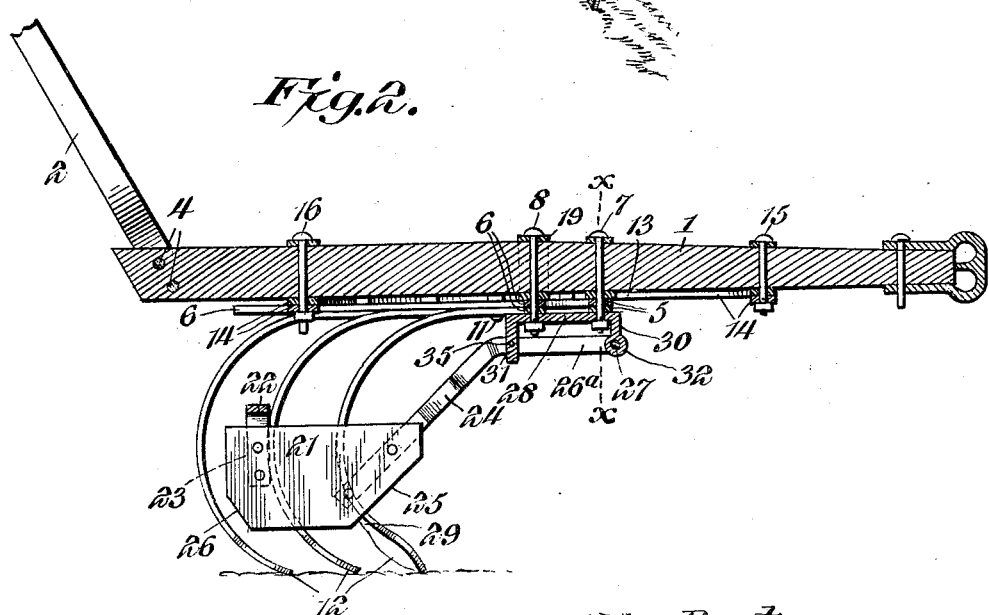

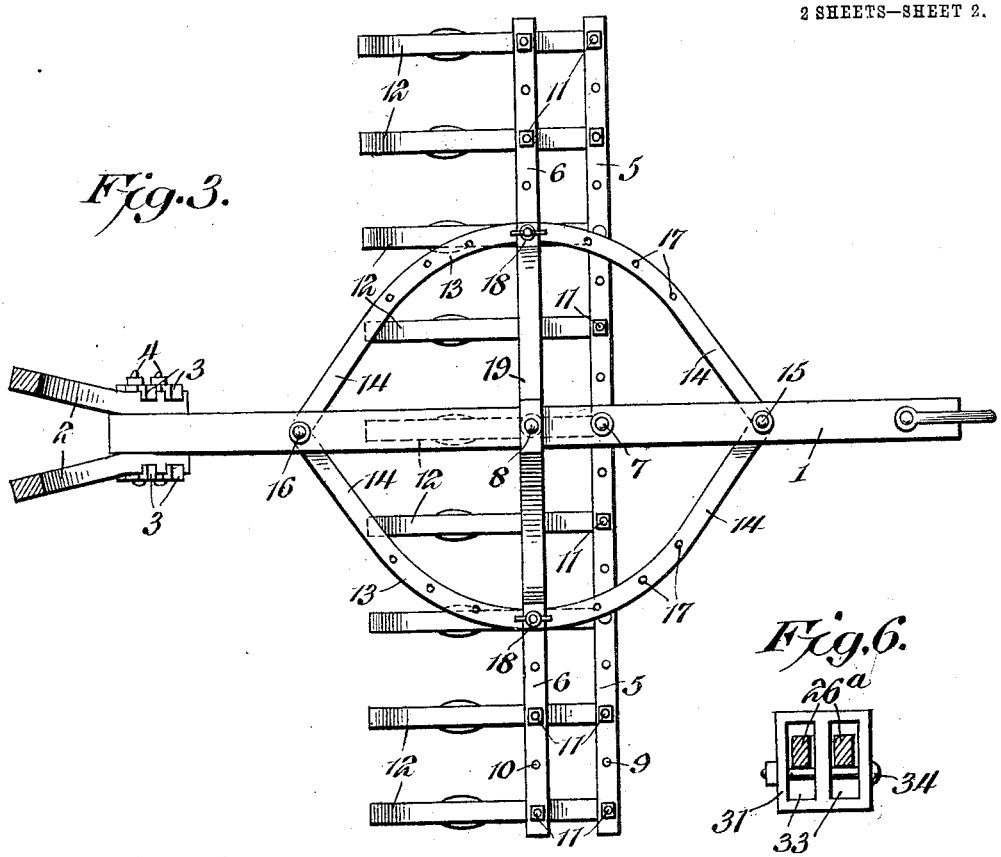

UNITED STATES PATENT OFFICE.

ABBA BENTON AND CHARLES D. JORDAN, OF MONTICELLO, GEORGIA.

COMBINED CULTIVATOR, HARROW, AND RAKE.

No. 902,367.  Specification of Letters Patent.  Patented Oct. 27, 1908.

Application filed August 5, 1907. Serial No. 387,161.

*To all whom it may concern:*

Be it known that we, ABBA BENTON and CHARLES D. JORDAN, citizens of the United States, residing at Monticello, in the county of Jasper and State of Georgia, have invented a new and useful Combined Cultivator, Harrow, and Rake, of which the following is a specification.

The invention relates to a combined cultivator, harrow and rake.

The object of the present invention is to improve the construction of cultivators, and to provide a simple and comparatively inexpensive one of great strength and durability, capable of being readily arranged as a cultivator, harrow or rake.

A further object of the invention is to provide a cultivator of this character, having a fender capable of a limited upward and downward movement to prevent it from becoming clogged with stones or clods, and capable also of effectually protecting young plants and of preventing the same from being injured by the soil thrown inwardly by the cultivator teeth.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claim, may be resorted to without departing from the spirit or sacrificing any of the advantages of the invention.

In the drawings:—Figure 1 is a perspective view of a cultivator, constructed in accordance with this invention. Fig. 2 is a longitudinal sectional view of the same. Fig. 3 is a plan view, the cultivator teeth being arranged to form a rake. Fig. 4 is an enlarged detail sectional view, taken substantially on the line *x—x* of Fig. 2. Fig. 5 is a detail perspective view, illustrating the construction of the bracket or support for the arms of the fender. Fig. 6 is an enlarged detail view, illustrating the manner of limiting the downward movement of the fender in the rear openings of the bracket or support.

Like numerals of reference designate corresponding parts in all the figures of the drawings.

1 designates a beam, which is equipped at its rear end with handles 2, secured to the side faces of the beam by means of steel clamps 3 and bolts 4, which pierce the handles and the beam. Extending laterally from the beam at a point intermediate of the ends thereof are adjustable bars 5 and 6, disposed in pairs and arranged in parallelism. The laterally extending bars are secured at their inner ends to the lower face of the beam by means of vertical bolts 7 and 8, and they are provided at intervals with perforations 9 and 10 for the reception of bolts 11 for securing cultivator teeth 12 to the laterally extending bars. The bolts 7 and 8, which form pivots for the laterally extending bars, pierce the overlapped ends of the latter, as clearly illustrated in Figs. 2 and 4 of the drawings.

The cultivator teeth may be of any desired number, and when the parts are arranged to form a rake, as illustrated in Fig. 3 of the drawing, a central spring tooth is secured beneath the beam by the bolts 7 and 8, as illustrated in dotted lines in the said figure. The perforations between the teeth are also adapted to receive fastening devices for securing the additional teeth to the laterally extending bars, and this will enable the rake to be equipped with seventeen teeth. The laterally extending bars may be varied in length, and the bolt holes may be varied in number to enable any desired number of perforations to be employed.

The adjustable laterally extending bars are adapted to be moved either backward or forward from the position at right angles to the beam illustrated in Fig. 3 of the drawings, and they are secured in their adjustment by means of side longitudinal braces 13, consisting of arcuate intermediate portions and straight terminal portions 14, which have overlapped terminals secured to the beam by means of front and rear bolts 15 and 16. The intermediate arcuate portions are provided at intervals with perforations 17 for the reception of bolts for securing the rear laterally extending bar 6 to the side brace. The bolts of the rear bar 6 contiguous to the braces 13 are provided with winged nuts 18 to enable them to be readily adjusted from one perforation to another of the said intermediate arcuate portions of the braces 13. The straight terminal portions of the side braces afford practically the strength of a straight brace, and they operate to distribute the strain to the several points of attachment of the laterally extending bars and the braces to the beam.

The laterally extending bars and the side braces are also braced by a top transverse brace 19, centrally secured to the upper face of the beam by the rear bolt 8 and having its terminal secured to the side brace at the arcuate portion thereof. The transverse brace 19, which is arched, consists of a single bar of metal having a horizontal central portion to fit the upper face of the beam 1, and provided with horizontal end portions fitting the upper faces of the curved side braces 14 and arranged at the centers of the same. When the laterally extending bars are arranged at right angles to the beam, the terminals of the top brace are secured to the side braces by the fastening device for securing the rear laterally extending bar to the arcuate side brace, as clearly illustrated in Fig. 3 of the drawings, but when the laterally extending bars are swung rearwardly from this position to the position illustrated in Fig. 1 of the drawings, the terminals of the transverse braces are secured to the side braces by additional bolts 20. The sides of the transverse brace are inclined, and they are adapted to prevent the laterally extending bars and the side braces from springing upward, and they serve to hold the cultivator teeth in the ground.

When the parts are arranged to form a cultivator for cultivating young plants, a fender is employed for preventing the cultivator teeth from throwing the soil upon young plants and injuring the same. The fender is composed of a pair of longitudinal blades 21, arranged in parallelism and connected at their rear portions by a transverse brace 22, having its terminals 23 bent downwardly at right angles and secured by rivets, or other suitable fastening devices to the blades 21. The blades are provided at their front portions with arms 24, having inclined portions secured to the outer faces of the blades by rivets, or other suitable fastening devices. The blades of the fender have their lower, front and rear corners cut away to form front and rear inclined edges 25 and 26. The arms 24 converge forwardly and upwardly and are provided with straight horizontally disposed front portions 26$^a$, arranged in parallelism and pivoted at their front terminals by a transverse bolt 27 to the front of a bracket or support 28. The transverse brace 22 and the front inclined arms 24 maintain the blades in parallelism and in proper position with relation to the cultivator teeth.

The innermost cultivator teeth are provided at an intermediate point between their ends with twists or bends 29, which set the lower soil-engaging portions of the teeth at an angle to the upper or shank portions of the same. The soil-engaging portions of the intermediate and outer cultivator teeth are arranged in the same plane as the contiguous portions of the shanks of the same and are disposed at right angles to the line of draft, when the laterally extending bars 5 and 6 are arranged at right angles to the beam. These angularly disposed soil-engaging portions, which are arranged diagonally with relation to the line of draft of the cultivator, are adapted to throw the soil either toward or from the plants, and the innermost teeth may be changed from one side of the cultivator to the other to effect this result. The fender blades, which are located between the opposite cultivator teeth, protect the young plants and prevent the same from being covered or injured by the soil.

The bracket or support 28 consists of a top plate or portion provided at its front end with a depending lug 30 and having a rear transverse portion 31. The top plate or portion is arranged beneath the beam and is connected with the same by means of the bolts 7 and 8, which rigidly hold the bracket or support in position. The bracket or support is also adapted to be secured to either set or pair of laterally extending bars, so as to throw the beam to one side of the fender of the harrow to prevent the draft animal or animals from tramping on young plants. The front lug 30 is provided at its lower end with an eye 32 for the reception of the transverse bolt 27, and the rear transverse portion 31 is provided at opposite sides of its center with vertical openings 33 in which the front horizontal portions of the arms of the fender blades have a limited upward and downward movement to permit the fender blades to ride over stones and clods and to prevent the fender blades from becoming clogged by the same. This limited upward and downward movement enables the fender to effectually protect the plants, while preventing the former from becoming clogged. This upward and downward movement may be further restricted by placing a pin 34 beneath the arms of the fender, as illustrated in Fig. 6 of the drawings. The pin 34, which limits the downward movement of the fender, is passed through the transverse portion 31 of the bracket or support, suitable perforations 35 being provided near the bottom thereof for this purpose. This construction is designed to permit the fender to be used on larger plants without crushing or otherwise injuring the same. When the plants increase in size and are too large to be safely operated on by the fender in its lowermost position, the pin 34 is placed beneath the fender and will limit the downward movement of the same and thereby prevent the fender blades from coming in contact with the plants.

A cultivator tooth may be substituted for the fender blades to provide a simple cultivator, and the central tooth of the series may be mounted at either side of the beam to provide a side harrow or cultivator.

Having thus fully described our invention, what we claim as new and desire to secure by Letters Patent, is:—

The combination with a beam, of curved side braces secured to the beam, a transverse brace constructed of a single bar of metal and permanently arranged at right angles to the beam and extending therefrom to the side braces, laterally extending parallel bars arranged in pairs and pivoted at their inner ends to the beam, spaced sets of teeth carried by and connecting the members of each pair of laterally extending bars, the inner teeth of the sets being twisted at an intermediate point to arrange their soil-engaging portions at an angle to the line of draft and being interchangeable so as to throw the soil either toward or from the plants, the other teeth having their soil-engaging portions disposed in the same plane as the contiguous portions of the shanks.

In testimony, that we claim the foregoing as our own, we have hereto affixed our signatures in the presence of two witnesses.

ABBA BENTON.
CHARLES D. JORDAN.

Witnesses:
M. S. BENTON,
W. M. BULLARD.